(12) United States Patent
Elder et al.

(10) Patent No.: US 9,317,692 B2
(45) Date of Patent: Apr. 19, 2016

(54) SYSTEM AND METHOD FOR VULNERABILITY RISK ANALYSIS

(75) Inventors: Matthew Cruz Elder, Germantown, MD (US); Darrell Martin Kienzle, Vienna, VA (US); Pratyusa K. Manadhata, Marina Del Rey, CA (US); Ryan Kumar Persaud, Fairfax, CA (US)

(73) Assignee: Symantec Corporation, Mountain View, CA (US)

( * ) Notice: Subject to any disclaimer, the term of this patent is extended or adjusted under 35 U.S.C. 154(b) by 594 days.

(21) Appl. No.: 12/784,972

(22) Filed: May 21, 2010

(65) Prior Publication Data

US 2014/0189873 A1    Jul. 3, 2014

Related U.S. Application Data

(60) Provisional application No. 61/288,808, filed on Dec. 21, 2009.

(51) Int. Cl.
*G06F 21/57*    (2013.01)
*H04L 29/06*    (2006.01)

(52) U.S. Cl.
CPC .......... *G06F 21/577* (2013.01); *H04L 63/1433* (2013.01)

(58) Field of Classification Search
CPC ........................ G06F 21/577; H04L 63/1433

USPC .......................................................... 726/25
See application file for complete search history.

(56) References Cited

U.S. PATENT DOCUMENTS

| | | | |
|---|---|---|---|
| 7,013,395 B1* | 3/2006 | Swiler et al. | 726/25 |
| 2005/0138413 A1* | 6/2005 | Lippmann et al. | 713/201 |
| 2005/0193430 A1* | 9/2005 | Cohen et al. | 726/25 |
| 2008/0098479 A1* | 4/2008 | O'Rourke et al. | 726/25 |
| 2009/0077666 A1* | 3/2009 | Chen et al. | 726/25 |
| 2009/0293128 A1* | 11/2009 | Lippmann et al. | 726/25 |
| 2010/0095381 A1* | 4/2010 | Levi | 726/25 |

* cited by examiner

*Primary Examiner* — Ellen Tran
(74) *Attorney, Agent, or Firm* — Wilmer Cutler Pickering Hale and Dorr LLP

(57) ABSTRACT

Embodiments of the present invention are directed to a method and system for automated risk analysis. The method includes accessing host configuration information of a host and querying a vulnerability database based on the host configuration information. The method further includes receiving a list of vulnerabilities and accessing a plurality of vulnerability scores. The list of vulnerabilities corresponds to vulnerabilities of the host. Vulnerabilities can be removed from the list based on checking for installed fixes corresponding to vulnerability. A composite risk score can then be determined for the host and each software product of the host based on the plurality of vulnerability scores. An aggregate risk score can then be determined for the host and each software product of the host based on the plurality of vulnerability scores.

20 Claims, 9 Drawing Sheets

SYSTEM AND METHOD FOR VULNERABILITY RISK ANALYSIS

CROSS REFERENCE TO RELATED U.S. APPLICATIONS

This application claims the benefit of provisional patent application Ser. No. 61/288,808, entitled "LARGE SCALE CONFIGURATION MANAGEMENT," with filing date Dec. 21, 2009, and hereby incorporated by reference in its entirety.

GOVERNMENT LICENSE RIGHTS

This Invention was made with Government support under FA8750-08-9-0009 awarded by Air Force Research Laboratory/RIKD, Rome Research Site, 26 Electronic Parkway, Rome, N.Y. 13441. The Government has certain rights in the Invention.

FIELD OF THE INVENTION

Embodiments of the present invention are generally related to digital computer systems and computer system security.

BACKGROUND OF THE INVENTION

As computing systems have advanced and become cheaper, enterprises have an increasingly large number of computers. At the same time, software applications and operating systems have become increasingly complex and the number of security vulnerabilities has increased. Security threats of a variety of threat levels are discovered frequently and new security threats may be discovered everyday. Accordingly, analysis of security vulnerabilities has become increasingly important as security vulnerabilities may expose an enterprise to significant harm, including theft of valuable and sensitive information, damage to valuable work products (e.g., deletion or corruption of files, data, or software programs, etc.), and system damage causing loss of productivity, revenue, etc.

Conventional risk management techniques do not utilize endpoint client configuration data for detailed security analysis. For example, client configuration data is typically compared against checklists of best practices and allowed/disallowed configuration elements, such as allowed software programs. Such high-level approaches to client configuration security do not provide detailed quantification of risks associated with client configurations. Further, prioritization of security risks is not presented and thereby does not enable reduction of the risks associated with client vulnerabilities.

SUMMARY OF THE INVENTION

Accordingly, embodiments of the present invention provide a system and method for automatically calculating risk based on client configuration data and vulnerability information. The risk analysis provides detailed analysis including the host contributing the most risk to the enterprise, the software product contributing the most risk to the enterprise, and the vulnerability contributing the most risk to the enterprise, etc.

In one embodiment, the present invention is implemented as a method for risk analysis. The automated method includes accessing host configuration information of a host and querying a vulnerability database (e.g., the National Vulnerability Database (NVD)) based on the host configuration information. In one embodiment, the host configuration information comprises information about a plurality of software applications and an operating system on the host. The method further includes receiving a list of vulnerabilities (e.g., corresponding to the vulnerabilities of the host) and accessing a plurality of vulnerability scores (e.g., Common Vulnerability Scoring System (CVSS) scores).

A composite risk score can then be automatically determined for the host and each software product of the host based on the plurality of vulnerability scores. An aggregate risk score can then be automatically determined for the host and each software product of the host based on the plurality of vulnerability scores. In one embodiment, the method further includes: querying a fixes database based on the list of vulnerabilities, receiving a list of fixes, and checking the list of fixes against the host configuration information. Some embodiments of the present invention are operable to determine: a software product contributing the most risk to an enterprise, a host contributing the most risk to the enterprise, and a vulnerability contributing the most risk to the enterprise.

In one embodiment, the present invention is implemented as a computer readable storage medium having stored thereon, computer executable instructions that, if executed by a computer system, cause the computer system to perform a method including accessing host configuration information of a host and querying a vulnerability database (e.g., the National Vulnerability Database (NVD)) based on the host configuration information. In one embodiment, the host configuration information comprises information about a plurality of software applications and an operating system on the host. The method further includes receiving a list of vulnerabilities (e.g., corresponding to the vulnerabilities of the host) and accessing a plurality of vulnerability scores (e.g., Common Vulnerability Scoring System (CVSS) scores). A composite risk score can then be determined for the host and each software product of the host based on the plurality of vulnerability scores. An aggregate risk score can then be determined for the host and each software product of the host based on the plurality of vulnerability scores. In one embodiment, the method further includes: querying a fixes database based on the list of vulnerabilities, receiving a list of fixes, and checking the list of fixes against the host configuration information. Some embodiments of the present invention are operable to determine: a software product contributing the most risk to an enterprise, a host contributing the most risk to the enterprise, and a vulnerability contributing the most risk to the enterprise.

In yet another embodiment, the present invention is implemented as a clustered computing system comprising a computer system having one or more processors coupled to a computer readable storage media and executing computer readable code which causes the computer system to implement a process including accessing host configuration information of a host and querying a vulnerability database (e.g., the National Vulnerability Database (NVD)) based on the host configuration information. In one embodiment, the host configuration information comprises information about a plurality of software applications and an operating system on the host. The method further includes receiving a list of vulnerabilities (e.g., corresponding to the vulnerabilities of the host) and accessing a plurality of vulnerability scores (e.g., Common Vulnerability Scoring System (CVSS) scores). A composite risk score can then be determined for the host and each software product of the host based on the plurality of vulnerability scores. An aggregate risk score can then be determined for the host and each software product of the host based on the plurality of vulnerability scores. In one embodiment, the method further includes: querying a fixes database based on the list of vulnerabilities, receiving a list of fixes, and checking the list of fixes against the host configuration information. Embodiments of the present invention are operable to determine: a software product contributing the most risk to an enterprise, a host contributing the most risk to the enterprise, and a vulnerability contributing the most risk to the enterprise.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
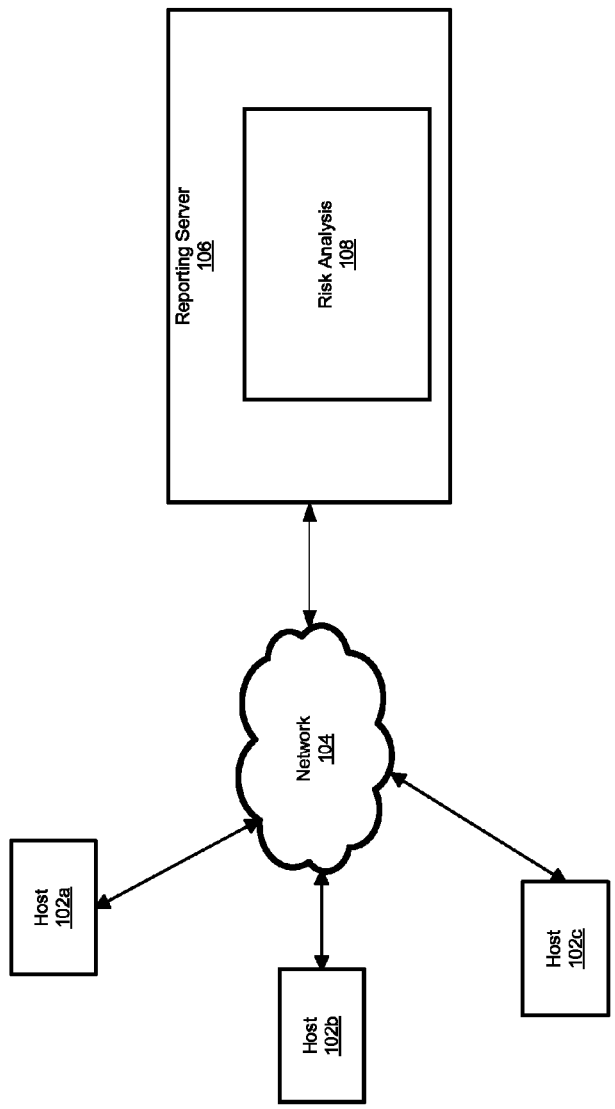
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "enabling," "sending," "determining," "responding," "accessing," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment, in accordance with one embodiment of the present invention. Exemplary operating environment 100 includes hosts 102a-c, network 104, and reporting server 106. It is appreciated that components of exemplary operating environment 100 are exemplary and more or fewer components may be present in various configurations. It is appreciated that operating environment 100 may be part of a distributed computing environment, a cloud computing environment, a client server environment, etc.

Hosts 102a-c may access other servers and other resources (not shown) of network 104. Host 102a-c may be a variety of computing systems include desktop computers, point of sale systems, laptops, netbooks, phones, smart phones, etc. Reporting server 106 collects configuration data from hosts 102a-c for risk analysis by risk analysis module 108. In one embodiment, the data collected by risk analysis module 108 includes configuration details regarding hardware, operating system, patches, hotfixes, applications, and associated versions of each.

In one embodiment, risk analysis module 108 maintains an updated database of vulnerabilities (e.g., such as that provided by the National Vulnerability Database (NVD), fix databases, etc.). The database catalogs vulnerabilities associated with configuration elements including operating systems, applications, and particular versions of each that are vulnerable. The database may further include fix or patch information which indicates which patches and hotfixes address vulnerabilities.

Risk analysis module 108 correlates the host configuration data against the vulnerability database data in order to quantify and prioritize the risks associated with deployed host configurations. These calculations can be updated and recalculated as often as necessary or desired, for example when a new significant vulnerability is announced or every time periodic updates occur in the host configuration data.

Thus, embodiments of the present invention provide automated enterprise risk analysis, quantification, and prioritization based on data collected from endpoint host configurations and vulnerability database data (e.g., the National Vulnerability Database (NVD) or fix vulnerability data). Embodiments of the present invention provide risk results that can be continually updated and recalculated as any changes/updates occur in either the host configuration data or the vulnerability database data.

Figure 2:
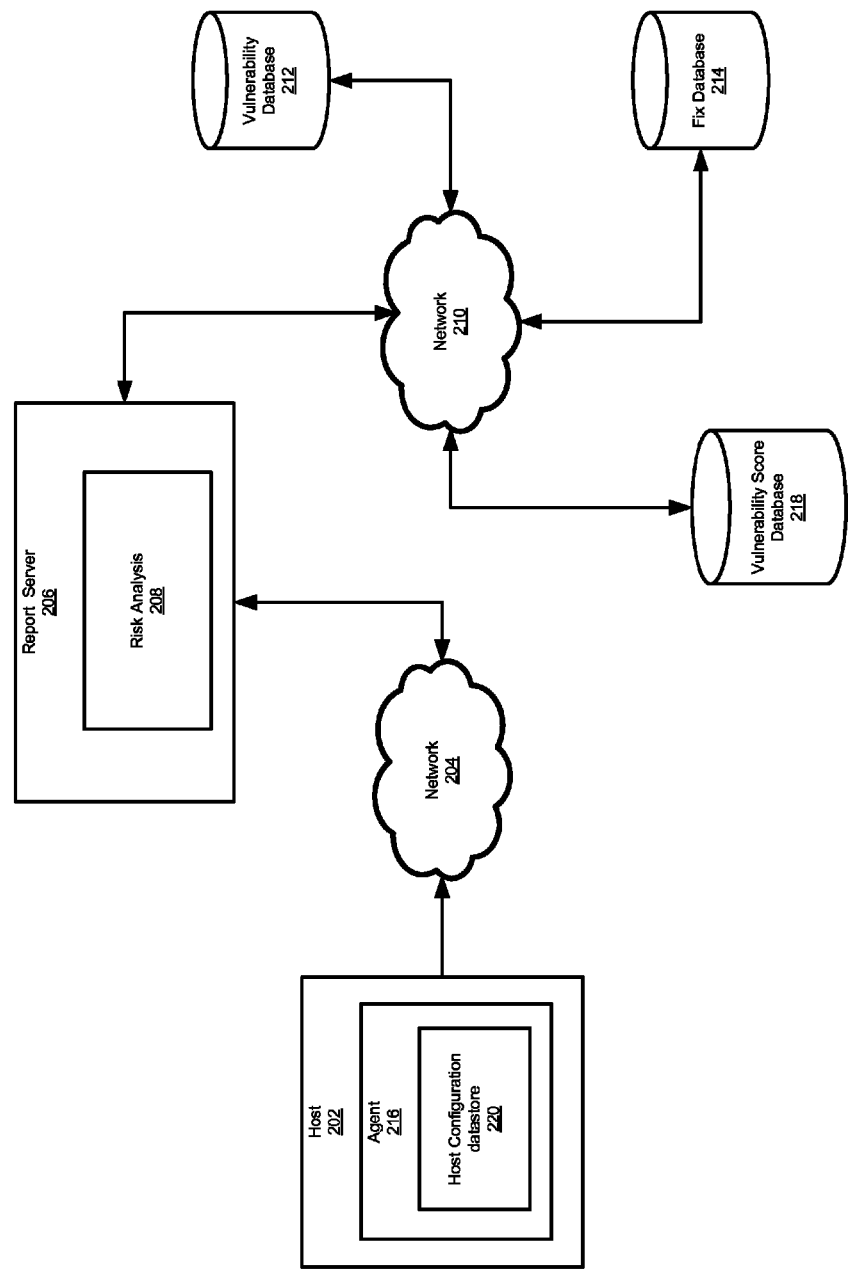
FIG. 2 shows a block diagram of exemplary components involved in risk analysis, in accordance with one embodiment of the present invention.

FIG. 2 shows a block diagram of exemplary components involved in risk analysis, in accordance with one embodiment of the present invention. Diagram 200 includes host 202, networks 204 and 210, report server 206, vulnerability database 212, fix database 214, and vulnerability scores database 218. It is appreciated that the data of vulnerability database 212, fix database 214, and vulnerability scores database 218 may be stored a single database. Vulnerability database 212 contains information including security vulnerabilities associated with installed software programs. Fix database 214 contains information on fixes (e.g., software updates, software patches, hotfixes, etc.) and corresponding vulnerabilities. Vulnerability score database 218 contains information including the score (e.g., threat level) of a variety of vulnerabilities. FIG. 2 depicts the use of networks 204 and 210 such as the Internet for exchanging data, but the present disclosure is not limited to the Internet or any particular network-based environment.

Host 202 includes agent 216 which automatically collects and accesses host configuration datastore 220 from host 202. Report server 206 includes risk analysis module 208 which performs risk analysis based on host configuration data 220, vulnerability database 212, fix database 214, and vulnerability scores database 218. In one embodiment, agent 216 facilitates management of host 202 in a coordinated manner with other hosts (e.g., hosts 102a-c) within an enterprise (e.g., with a central management server).

In one embodiment, agent 216 may collect configuration information from the registry of a system with the Windows® operating system, available from Microsoft Corporation of Redmond, Wash. For example, configuration information for the operating system can be accessed via the HKEY_LOCAL_MACHINE\SOFTWARE\Microsoft\Windows NT\CurrentVersion key which provides the specific operating system version, service pack installed, and build number. The installed programs can be collected from the HKEY_LOCAL_MACHINE\SOFTWARE\Microsoft\Windows\CurrentVersion\Uninstall key which includes high level data regarding the operating system, applications that are installed, operating system hotfixes/updates, and application patches. Configuration data may further be collected based on an enumeration of the portable executable (PE) files (e.g., executable (.exe) files and dynamic link library (DLL) files) on the file system. This enumeration provides a comprehensive listing of each software program that could be run on a host, independent of whether program was installed properly within the operating system, downloaded (e.g., intentionally or otherwise), or remaining as a result of an improper uninstall.

Figure 3:
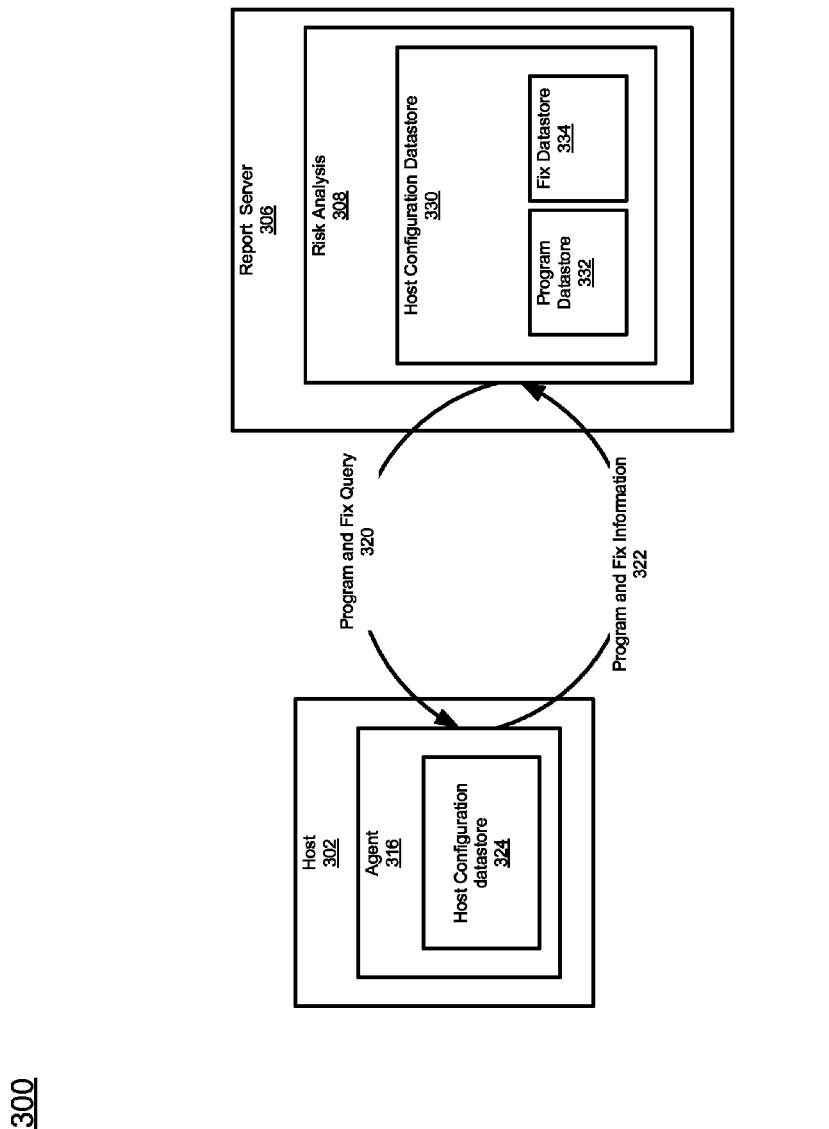
FIG. 3 shows a block diagram of exemplary communication between a host and a report server, in accordance with one embodiment of the present invention.

FIG. 3 shows a block diagram of exemplary communication between a host and a report server, in accordance with one embodiment of the present invention. Diagram 300 includes host 302 and report server 306. Host 302 includes agent 316 which collects host configuration datastore 324, as described herein. Report server 306 includes risk analysis module 308 which includes host configuration datastore module 330. Host configuration datastore module 330 includes program datastore 332 operable to store a list of software programs installed on a plurality of hosts (e.g., hosts 102a-c). Fix datastore 334 is operable to store a list of fixes installed on a plurality of hosts (e.g., hosts 102a-c).

Risk analysis module 308 issues program and fix query 320 to agent 316 of host 302. Agent 316 responds with program and fix information 322 which includes the information stored in host configuration datastore 324 which was collected by agent 316. In one embodiment, risk analysis module 308 stores program information of program and fix information 322 into program datastore 332. Risk analysis module 308 stores fix information from program and fix information 322 into fix datastore 334.

Figure 4:
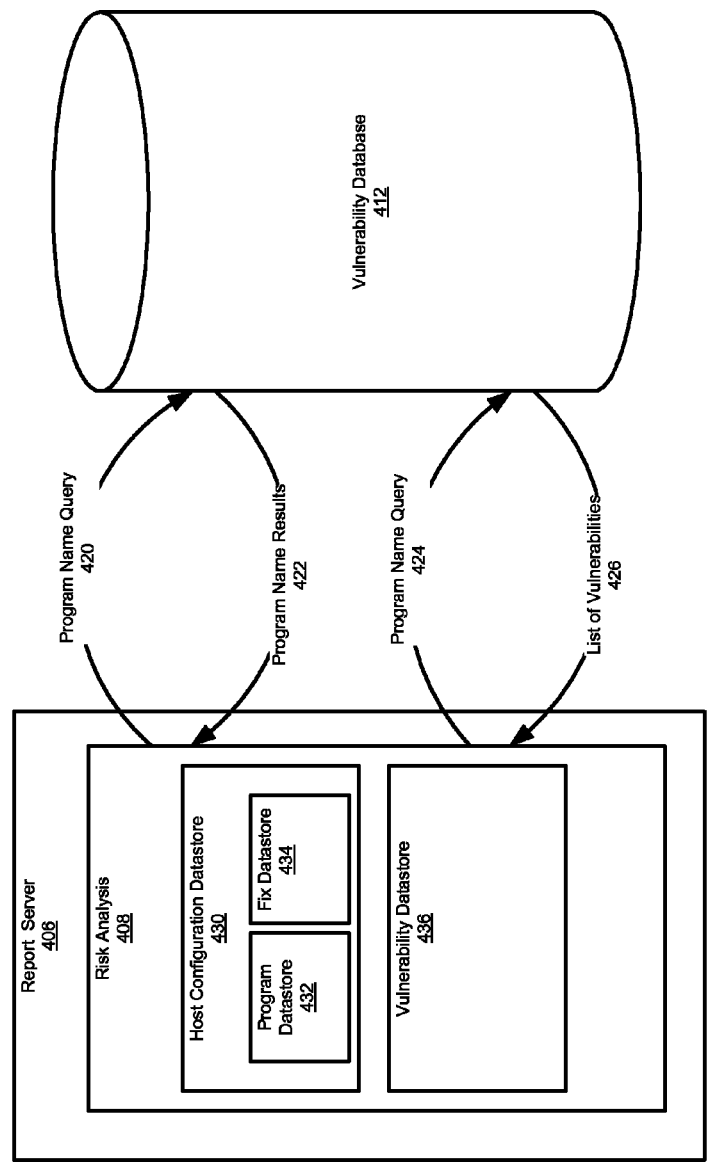
FIG. 4 shows a block diagram of an exemplary query to a vulnerability database, in accordance with an embodiment of the present invention.

FIG. 4 shows a block diagram of an exemplary query to a vulnerability database, in accordance with an embodiment of the present invention. Diagram 400 includes report server 406 which includes risk analysis module 408. Risk analysis module 408 issues program name query 420 to vulnerability database 412 which includes the list of programs stored in program datastore 432. In one embodiment, the list of the programs comprises the programs for each host (e.g., host). Embodiments of the present invention use the most precise version number available for each software program. Vulnerability database 412 responds with program name results 422 which includes program names and versions that have vulnerabilities.

In one embodiment, vulnerability database 412 is the National Vulnerability Database (NVD). The program name query 420 issued by risk analysis module 408 may include program names based on a plurality of common platform enumerations (CPEs). CPEs are a list of specific product names that is used to precisely identify a specific version of a product. The CPEs are cross-listed with and used by the NVD to map vulnerabilities to only those exact products and versions to which the vulnerabilities apply.

Risk analysis module 408 then issues program name query 424 which includes a list of programs with vulnerabilities. Vulnerability database 412 responds with list of vulnerabilities 426 which includes the vulnerabilities based on matching the program names with the vulnerabilities. In one embodiment, list of vulnerabilities 426 includes a plurality of common vulnerability enumerations (CVEs).

Figure 5:
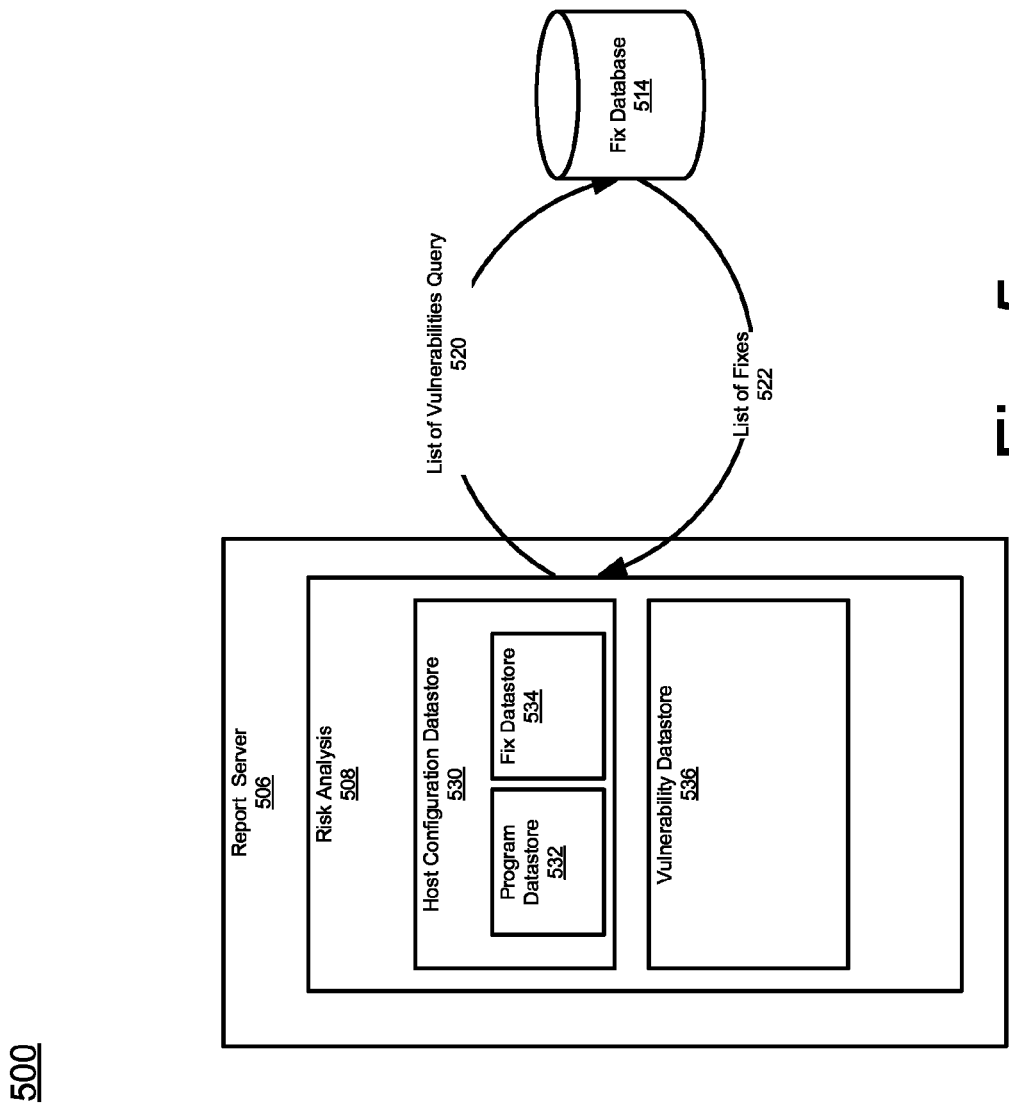
FIG. 5 shows a block diagram of an exemplary query to a fix database, in accordance with an embodiment of the present invention.

FIG. 5 shows a block diagram of an exemplary query to a fix database, in accordance with an embodiment of the present invention. Diagram 500 includes report server 506 which includes risk analysis module 508. Risk analysis module 508 issues list of vulnerabilities query 520 to fix database 514. List of vulnerabilities query 520 includes the list of vulnerabilities from vulnerabilities datastore 536. In one embodiment, fix database 514 and vulnerabilities database 412 are part of the same database or data source.

In one embodiment, fix database 514 includes a list of fixes or patches that are mapped to each vulnerability. For each vulnerability there can be a variety of fixes including hotfixes, security rollups, and service packs for any number of different vulnerable versions of the product or products suffering that vulnerability.

Fix database 514 returns list of fixes 522. List of fixes 522 is used to filter the list of vulnerabilities stored in vulnerabilities datastore 536. For example, if a word processor program vulnerability is included in list of vulnerabilities query 520 and fix database 514 includes a fix for the vulnerability, that fix will be part of list of fixes 522. If risk analysis module 508 determines that the fix for the word processor program vulnerability is installed, the vulnerability is removed from vulnerabilities datastore 536. In one embodiment, list of the vulnerabilities query 520 comprises a plurality of vulnerabilities for a plurality of programs for a plurality of hosts.

Figure 6:
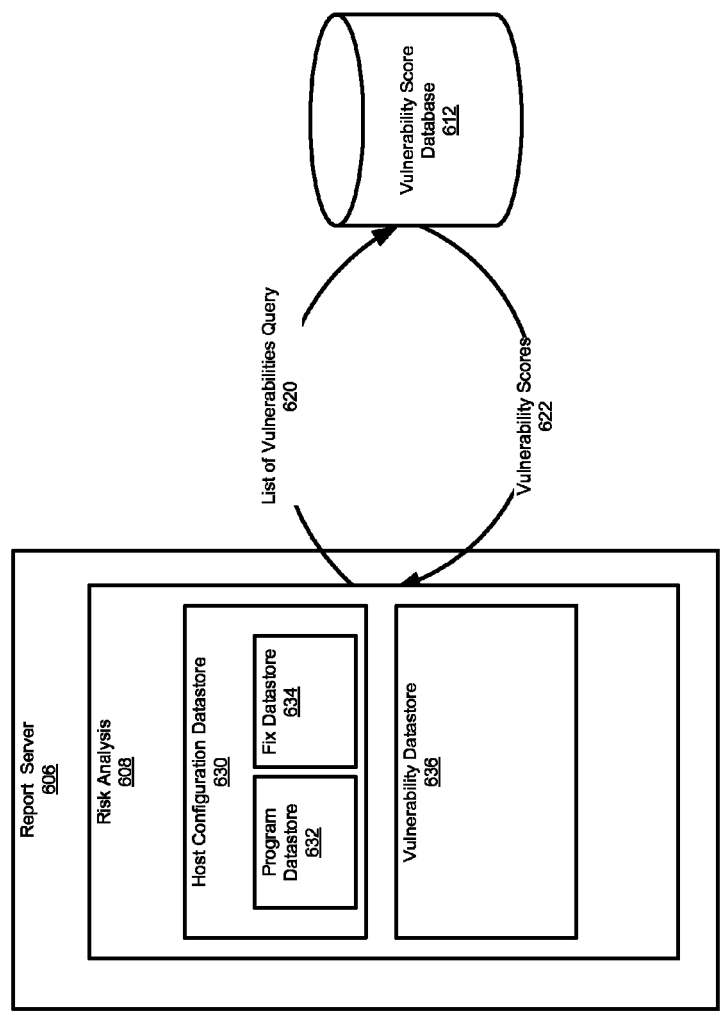
FIG. 6 shows a block diagram of an exemplary query to a vulnerability score database, in accordance with an embodiment of the present invention.

FIG. 6 shows a block diagram of an exemplary query to a vulnerability score database, in accordance with an embodiment of the present invention. Diagram 600 includes report server 606 which includes risk analysis module 608. Risk analysis module 608 issues list of vulnerabilities query 620 to vulnerability score database 612. List of vulnerabilities query 620 includes the list of vulnerabilities that was filtered based on installed fixes. It is appreciated that fix database 514 (FIG. 5), vulnerabilities database 412 (FIG. 4), and vulnerability score database 612 may be part of the same database or data source.

Vulnerability score database 612 returns vulnerability scores 622 which are used by risk analysis module 608 to determine risk tuples for each software program and client or host. In one embodiment, vulnerability scores 622 includes Common Vulnerability Scoring System (CVSS) scores. It is appreciated that other scoring systems could be utilized as the basis of risk calculations.

CVSS is part of Security Content Automation Protocol (SCAP) set of standards, developed by the U.S. Government, National Institute of Standards and Technology (NIST), MITRE, and others. CVSS provides a universal open and standardized method for rating IT vulnerabilities. CVSS scores are assigned to each vulnerability with a Common Vulnerability Enumeration (CVE) identifier, and each CVE vulnerability enumerates vulnerable configuration elements with a Common Platform Enumeration (CPE) identifier, where both the CVE and CPE are also part of the SCAP set of standards.

Risk analysis module 608 automatically provides detailed risk analysis, quantification, and prioritization based on each configuration element (e.g., programs and the operating system) installed on each host and a risk score is calculated based on the common vulnerability scoring system (CVSS) scores of the unpatched vulnerabilities associated with the specific version and patch/fix level of that element.

In one embodiment, the base metrics of CVSS version 2 are used for risk quantification calculations. The base metrics of the CVSS measure the fundamental qualities of a vulnerability. There are three different accessibility characteristics (e.g., access vector, access complexity, and authentication) and three types of impact (e.g., confidentiality, integrity, and availability). Each of these characteristics is assigned one of three values (e.g., effectively high, medium, or low). The CVSS specifies a formula for combining the three accessibility elements into an accessibility score and the three impact elements into an impact score and further combining those values into a formula to produce a score from 0 to 10.

In one embodiment, the risk tuple includes a composite CVSS score component and an aggregate CVSS score component for each program and each host. The composite CVSS score component of the risk tuple takes the highest accessibility score and highest impact score across all the vulnerabilities associated with a software program for a machine and calculates the composite CVSS score from that. The purpose of the composite CVSS component is to provide a measure of severity that reflects that only a single exploited vulnerability is needed by an attacker to achieve the effects of compromise and vulnerabilities associated with a product are not independent.

The aggregate CVSS component of the risk tuple provides a summation of the CVSS scores of all vulnerabilities associated with a program or a host. The aggregate CVSS calculation provides a measure of the number of options that are available to an attacker for a program or a host. The aggregate CVSS score also offers defenders a mechanism for measuring progress with respect to each remediation action (e.g., fix install or software upgrade). For example, when patching a single vulnerability among a plurality of vulnerabilities, the composite CVSS score component of the tuple may remain unchanged while the aggregate CVSS score component decreases.

In one embodiment, calculation of a risk quantification score is based on attack graph generation. For example, for a given piece of software, the attack graph can be constructed with the nodes being software states and the edges being the vulnerabilities present in the software. Based on the attack graph, the least accessibility needed (e.g., accessibility of one of the start nodes) and the highest impact (e.g., impact of one of the final nodes) can be determined. CVSS equations can then be used to compute the CVSS score. The CVSS score of the attack graph corresponds to the vulnerability score of the software.

In another embodiment, the attack graph is arranged as a linked list where the start node has the least accessibly needed of all vulnerabilities and the final node has the highest impact of all vulnerabilities. The CVSS score is then computed based on the attack graph and the composite CVSS score can then be determined. The aggregate CVSS score component can be computed based on the summation of all applicable vulnerabilities CVSS scores.

In one embodiment, the risk computation of a client is based on each piece of the set of software on the client being treated as dependent on each other pieces of software. The set of software may be treated as a single software system having the lowest accessibility of the set of software and the highest impact of the set of software. The CVSS score can then be computed from the least accessibility and the highest impact attributes to form the composite CVSS score component of the risk tuple. The aggregate CVSS score can be computed, as described herein, based on a summation of the CVSS vulnerabilities scores.

In another embodiment, the risk computation of a client is based on each piece of software being independent. The computation may then be based on the client's vulnerability being the highest vulnerability score among all the software running on the client. Alternatively, a summation approach can be used based on a summation of the Composite CVSS scores of each piece of software based on the principle that each piece of software makes a contribution to the client's vulnerability score.

Embodiments of the present invention thus perform automatic risk analysis, as described herein, that allows a user to be presented with actionable intelligence that can be used to prioritize remediation activities including: the host with the highest risk tuple in the enterprise, the product that contributes the most to the overall enterprise risk score, the vulnerability that contributes the most to the overall enterprise risk score.

Figure 7:
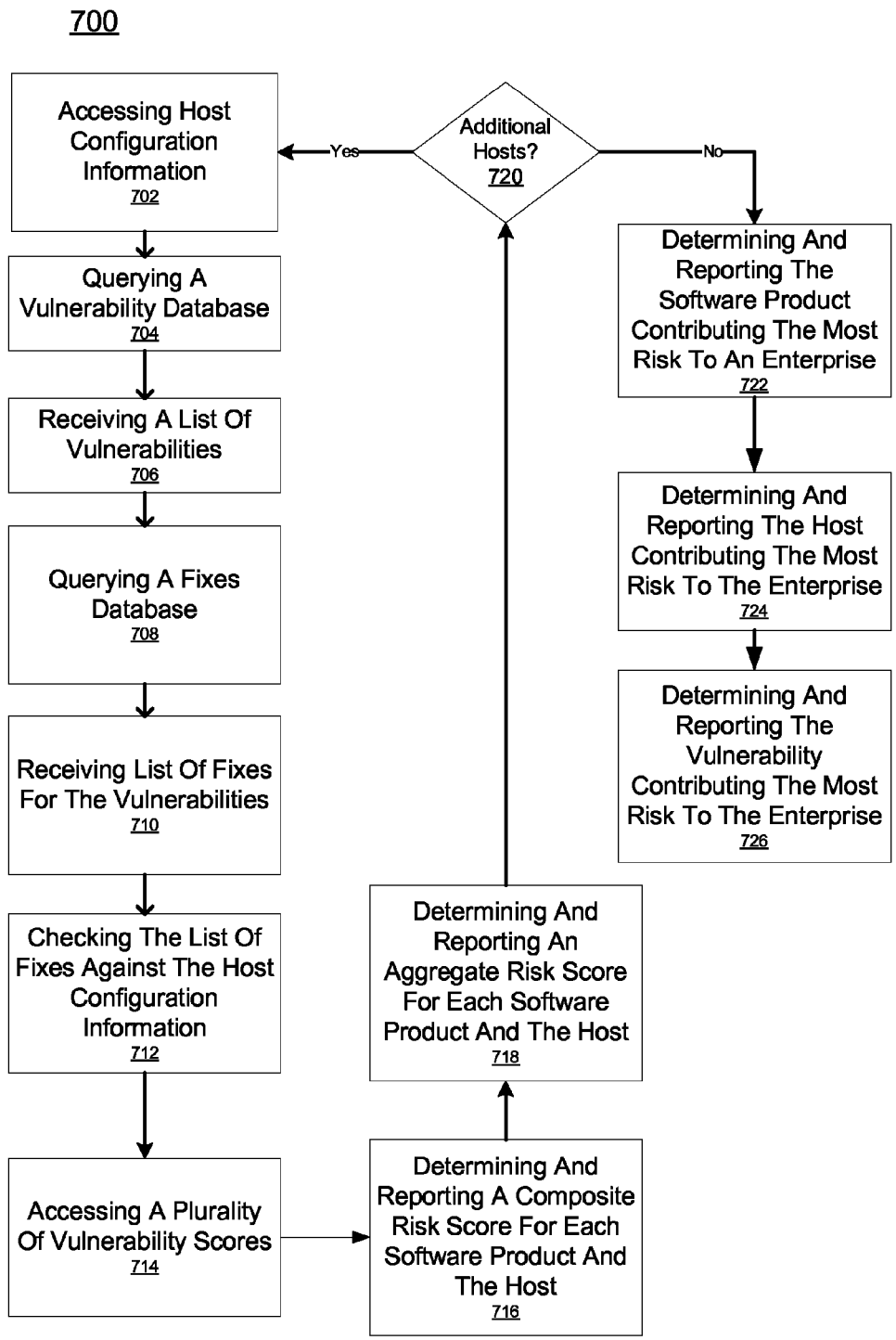
FIG. 7 shows an exemplary flowchart of processes for risk analysis, in accordance with embodiments of the present invention.

With reference to FIG. 7, exemplary flowchart 700 illustrates example computer controlled processes used by various embodiments of the present invention. Although specific blocks are disclosed in flowchart 700, such blocks are exemplary. That is, embodiments are well suited to performing various other blocks or variations of the blocks recited in flowchart 700. It is appreciated that the blocks in flowchart 700 may be performed in an order different than presented, and that not all of the blocks in flowchart 700 may be performed. Flowchart 700 includes processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 7 shows an exemplary flowchart of processes for risk analysis, in accordance with embodiments of the present invention. Process 700 may be performed by a server performing risk analysis (e.g., based on host configuration data).

At block 702, host configuration information of a host is accessed. As described herein, the host configuration information comprises information about a plurality of software applications and an operating system of a host.

At block 704, a vulnerability database is queried based on the host configuration information. In one embodiment, the vulnerability database is the National Vulnerability Database (NVD).

At block 706, a list of vulnerabilities is received. As described herein, the list of vulnerabilities corresponds to vulnerabilities of the host.

At block 708, a fixes database is queried based on the list of vulnerabilities. As described herein, the fixes database may include information on patches or fixes and corresponding vulnerabilities. At block 710, a list of fixes is received.

At block 712, the list of fixes is checked against the host configuration information. As described herein, the list of fixes may be checked against the fixes installed on a host.

At block 714, a plurality of vulnerability scores are accessed. In one embodiment, the vulnerability scores comprise Common Vulnerability Scoring System (CVSS) scores.

At block 716, a composite risk score for the host and each software product of the host is determined and reported based on the plurality of vulnerability scores.

At block 718, an aggregate risk score for the host and each software product of the host is determined and reported based on the plurality of vulnerability scores.

At block 720, whether there are additional hosts to be analyzed is determined. If there are additional hosts, block 702 is performed. If there are no additional hosts to be analyzed, block 722 is performed.

At block 722, a software product contributing the most risk to an enterprise is determined and reported. In one embodiment, the risk tuple is calculated for each product on each host client and is combined with a calculation of the frequency/extent of each vulnerable product to determine the software product contributing the most risk to the enterprise.

At block 724, a host contributing the most risk to the enterprise is determined and reported. In one embodiment, once the risk tuples have been computed for each host, the host with the greatest risk is computed by selecting the host with highest composite CVSS score. Ties may be resolved in favor of the host with the highest aggregate CVSS score.

At block 726, a vulnerability contributing the most risk to the enterprise is determined and reported. In one embodiment, the vulnerability that contributes the most to the overall enterprise risk score is calculated based on the frequency/extent of the vulnerability combined with its risk scores.

When a major new vulnerability is announced, embodiments of the present invention allow an administrator to recalculate the risk scores to understand how critical and widespread this vulnerability is in his or her enterprise and the level of important of remediation activities related to the new vulnerability. This thereby indicates which vulnerability should be patched first.

Figure 8:
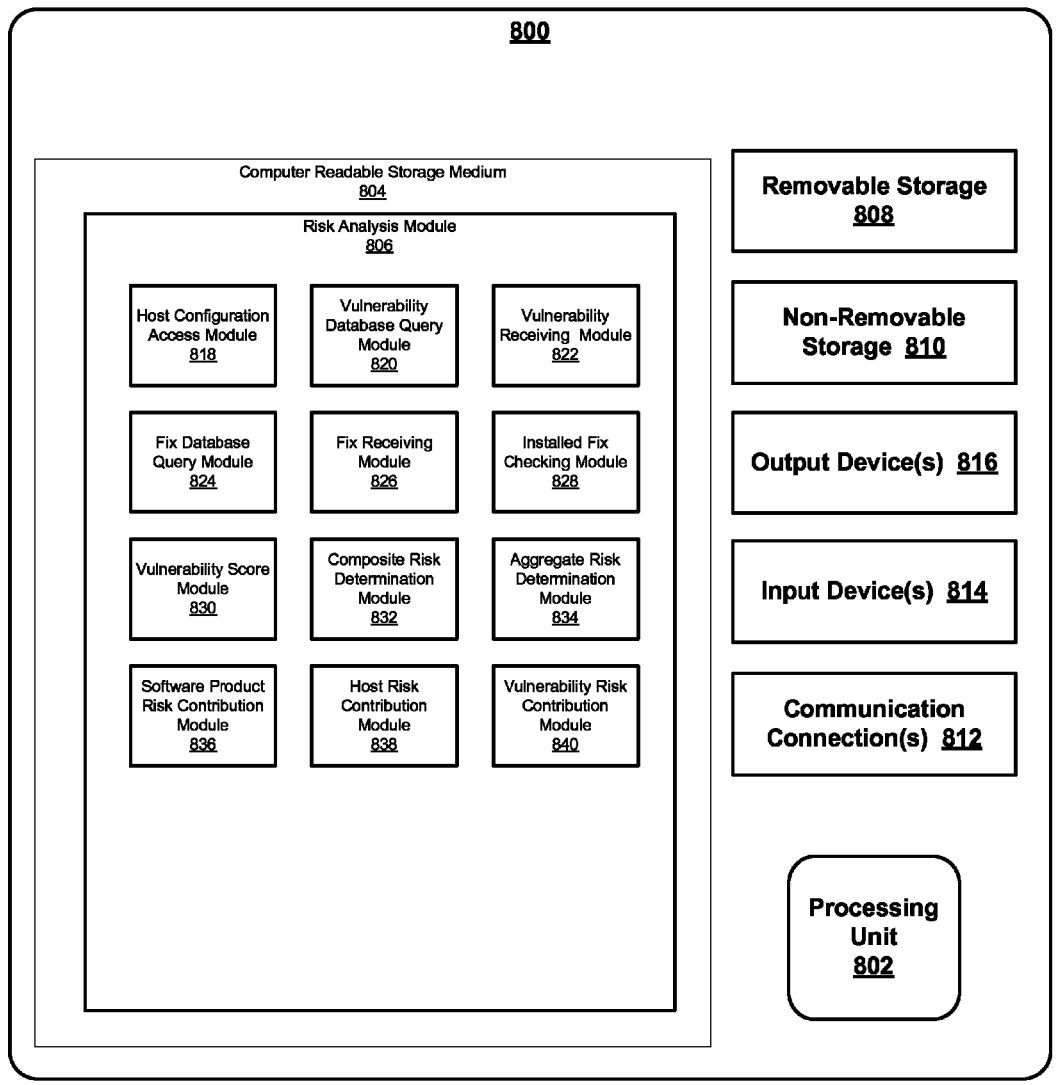
FIG. 8 shows a block diagram of exemplary computer system and corresponding modules, in accordance with one embodiment of the present invention.

FIG. 8 illustrates example components used by various embodiments of the present invention. Although specific components are disclosed in computing system environment 800, it should be appreciated that such components are examples. That is, embodiments of the present invention are well suited to having various other components or variations of the components recited in computing system environment 800. It is appreciated that the components in computing system environment 800 may operate with other components than those presented, and that not all of the components of system 800 may be required to achieve the goals of computing system environment 800.

FIG. 8 shows a block diagram of an exemplary computing system environment 800, in accordance with one embodiment of the present invention. With reference to FIG. 8, an exemplary system module for implementing embodiments includes a general purpose computing system environment, such as computing system environment 800. Computing system environment 800 may include, but is not limited to, servers (e.g., reporting server 106), desktop computers, laptops, tablet PCs, mobile devices, and smartphones. In its most basic configuration, computing system environment 800 typically includes at least one processing unit 802 and computer readable storage medium 804. Depending on the exact configuration and type of computing system environment, computer readable storage medium 804 may be volatile (such as RAM), non-volatile (such as ROM, flash memory, etc.) or some combination of the two. Portions of computer readable storage medium 804 when executed facilitate risk analysis (e.g., process 700).

Additionally, computing system environment 800 may also have additional features/functionality. For example, computing system environment 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Computer readable medium 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 800. Any such computer storage media may be part of computing system environment 800.

Computing system environment 800 may also contain communications connection(s) 812 that allow it to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 812 may allow computing system environment 800 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 812 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 800 may also have input device(s) 814 such as a keyboard, mouse, pen, voice input device, touch input device, remote control, etc. Output device(s) 816 such as a display, speakers, etc. may also be included. All these devices are well known in the art and are not discussed at length.

In one embodiment, computer readable storage medium 804 includes risk analysis module 806. Risk analysis module 806 includes host configuration access module 818, vulnerability database query module 820, vulnerability receiving module 822, fix database query module 824, fix receiving module 826, installed fix checking module 828, vulnerability score module 830, composite risk determination module 832, aggregate risk determination module 834, software product risk contribution module 836, host risk contribution module 838, and vulnerability risk contribution module 840.

Host configuration access module 818 is operable to access host configuration information (e.g., host configuration information collected by an agent running on a host), as described herein. Vulnerability database query module 820 is operable to query a vulnerability database (e.g., a query based on software products within collected host configuration information), as described herein. Vulnerability receiving module 822 is operable to receive a list of vulnerabilities, as described herein.

Fix database query module 824 is operable to query a fixes database (e.g., based on list of software products having vulnerabilities), as described herein. Fix receiving module 826 is operable to receive a list of fixes (e.g., corresponding to software products with vulnerabilities), as described herein. Installed fix checking module 828 is operable to check a list of fixes against fixes installed on a host, as described herein. Vulnerability score module 830 is operable to access a plurality of vulnerability scores, as described herein.

Composite risk determination module 832 is operable to determine and report a composite risk score for a host and each software product on the host, as described herein. Aggregate risk determination module 834 is operable to determine and report an aggregate risk score for a host and each software product on the host, as described herein. Software product risk contribution module 836 is operable to determine the software product contributing the most risk to an enterprise, as described herein. Host risk contribution module 838 is operable to determine the host contributing the most risk to an enterprise, as described herein. Vulnerability risk contribution module 840 is operable to determine the vulnerability contributing the most risk to an enterprise, as described herein.

Figure 9:
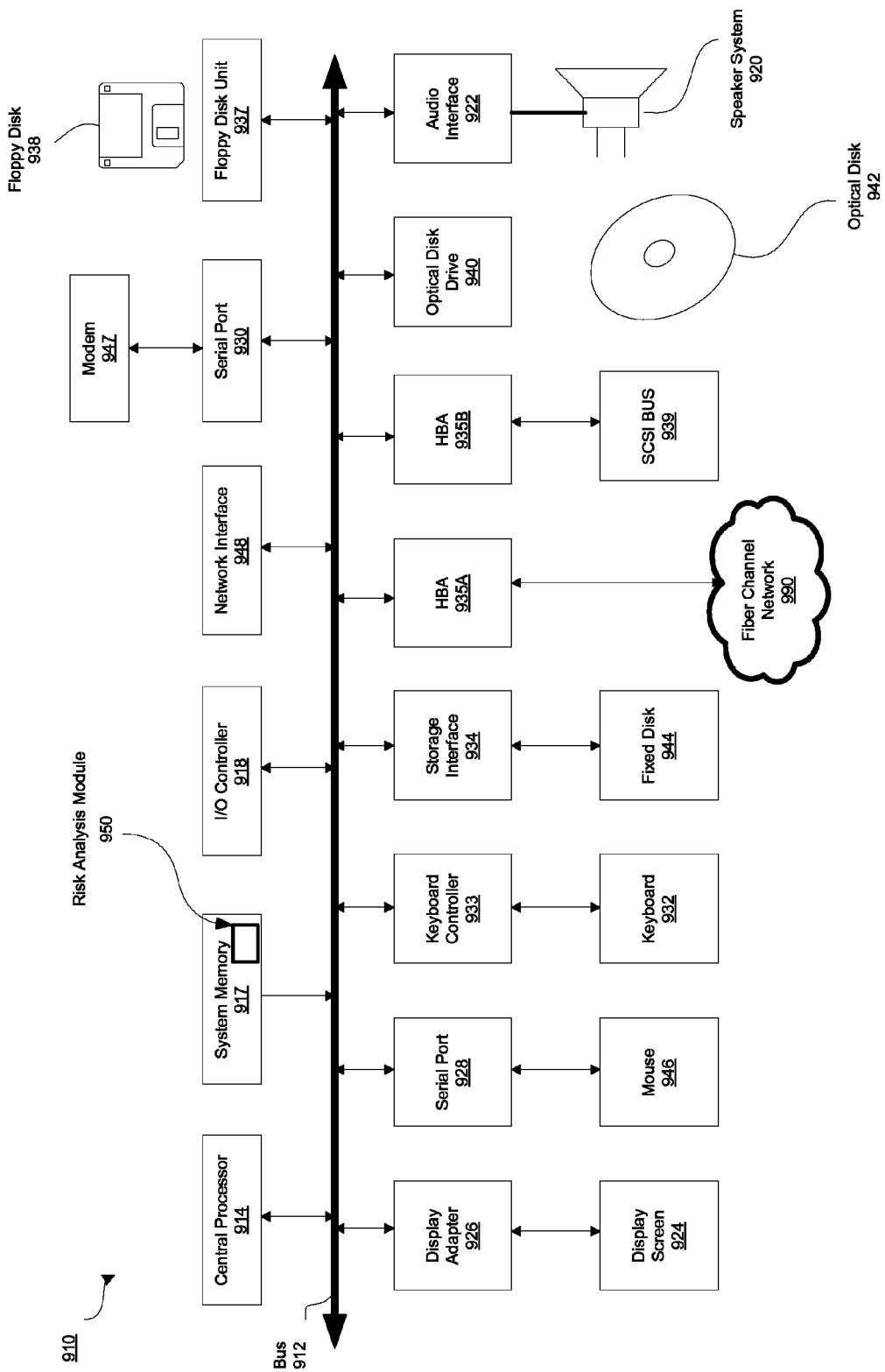
FIG. 9 shows a block diagram of another exemplary computer system, in accordance with one embodiment of the present invention.

FIG. 9 shows a block diagram of another exemplary computer system, in accordance with one embodiment of the present invention. FIG. 9 depicts a block diagram of a computer system 910 suitable for implementing the present disclosure. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912). System memory 917 includes risk analysis module 950 which is operable to perform risk analysis based on the host configuration information.

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Embodiments of the present invention thus provide a novel and advantageous way of automatically calculating risk based on client configuration data and vulnerability information. The risk analysis provide detailed analysis of the host contributing the most risk to the enterprise, the software product contributing the most risk to the enterprise, and the vulnerability contributing the most risk to the enterprise.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for analyzing risk, the method comprising:
accessing, within an electronic system, host configuration information of a host;
querying a vulnerability database based on said host configuration information;
receiving a list of vulnerabilities, wherein said list of vulnerabilities corresponds to vulnerabilities of said host;
accessing a plurality of vulnerability scores for said host and at least one software product of said host, wherein said plurality of vulnerability scores measure access vulnerability and vulnerability impact, and wherein said host and said at least one software product of said host are respectively associated with more than one of said plurality of vulnerability scores;
determining a composite risk score for at least one of said host and said at least one software product of said host based on said plurality of vulnerability scores, wherein said composite risk score measures at least in part a severity reflecting that an exploited vulnerability is needed by an attacker to compromise at least one of said host and said at least one software product of said host, and wherein said composite risk score is based on a highest vulnerability score among the more than one of said plurality of vulnerability scores respectively associated with at least one of said host and said at least one software product of said host;
determining an aggregate risk score for at least one of said host and said at least one software product of said host based on said plurality of vulnerability scores, wherein said aggregate risk score measures at least in part a number of options available to said attacker for compromising at least one of said host and said at least one software product of said host, and wherein said aggregate risk score is based on a summation among the more than one of said plurality of vulnerability scores respectively associated with at least one of said host and said at least one software product of said host;
generating a graph representing said at least one software product of said host, wherein nodes of said graph represent software states of said at least one software product, wherein edges of said graph represent vulnerabilities detected in said at least one software product, wherein a path through said graph begins at a start node having relatively lower access vulnerability, and wherein said path ends at an end node having relatively higher vulnerability impact; and
determining a risk score based on said path through said graph and at least one of said composite risk score and said aggregate risk score.

2. The method of claim 1 wherein said host configuration information comprises information about a plurality of software applications and an operating system.

3. The method of claim 1 further comprising:
querying a fixes database based on said list of vulnerabilities;
receiving a list of fixes; and
checking said list of fixes against said host configuration information.

4. The method of claim 3 further comprising:
determining a software product contributing the most risk to an enterprise.

5. The method of claim 4 further comprising:
determining a host contributing the most risk to said enterprise.

6. The method of claim 5 further comprising:
determining a vulnerability contributing the most risk to said enterprise.

7. The method of claim 1 wherein said vulnerability database is a National Vulnerability Database (NVD).

8. The method of claim 1 wherein said vulnerability scores comprise Common Vulnerability Scoring System (CVSS) scores.

9. A non-transitory computer readable storage medium having stored thereon, computer executable instructions that, if executed by a computer system cause the computer system to perform a method of risk analysis comprising:
accessing, within an electronic system, host configuration information of a host;
querying a vulnerability database based on said host configuration information;
receiving a list of vulnerabilities, wherein said list of vulnerabilities corresponds to vulnerabilities of said host;
accessing a plurality of vulnerability scores for said host and at least one software product of said host, wherein said plurality of vulnerability scores measure access vulnerability and vulnerability impact, and wherein said host and said at least one software product of said host are respectively associated with more than one of said plurality of vulnerability scores;
determining a composite risk score for at least one of said host and said at least one software product of said host based on said plurality of vulnerability scores, wherein said composite risk score measures at least in part a severity reflecting that an exploited vulnerability is needed by an attacker to compromise at least one of said host and said at least one software product of said host, and wherein said composite risk score is based on a highest vulnerability score among the more than one of said plurality of vulnerability scores respectively associated with at least one of said host and said at least one software product of said host;
determining an aggregate risk score for said host and said at least one software product of said host based on said plurality of vulnerability scores, wherein said aggregate risk score measures at least in part a number of options available to said attacker for compromising at least one of said host and said at least one software product of said host, and wherein said aggregate risk score is based on a summation among the more than one of said plurality of vulnerability scores respectively associated with at least one of said host and said at least one software product of said host;
generating a graph representing said at least one software product of said host, wherein nodes of said graph represent software states of said at least one software product, wherein edges of said graph represent vulnerabilities detected in said at least one software product, wherein a path through said graph begins at a start node having relatively lower access vulnerability, and wherein said path ends at an end node having relatively higher vulnerability impact; and
determining a risk score based on said path through said graph and at least one of said composite risk score and said aggregate risk score.

10. The computer readable storage medium of claim 9, wherein said host configuration information comprises information about a plurality of software applications and an operating system.

11. The computer readable storage medium of claim 9, wherein said method further comprises:
querying a fixes database based on said list of vulnerabilities;
receiving a list of fixes; and
checking said list of fixes against said host configuration information.

12. The computer readable storage medium of claim 9, wherein said method further comprises:
determining a software product contributing the most risk to an enterprise.

13. The computer readable storage medium of claim 9, wherein said method further comprises:
determining a host contributing the most risk to said enterprise.

14. The computer readable storage medium of claim 9, wherein said method further comprises:
determining a vulnerability contributing the most risk to said enterprise.

15. The computer readable storage medium of claim 9, wherein said vulnerability scores comprise Common Vulnerability Scoring System (CVSS) scores.

16. The computer readable storage medium of claim 9, wherein said vulnerability database is a National Vulnerability Database (NVD).

17. A system comprising:
a host configuration access module for accessing host configuration information;
a vulnerability database query module for querying a vulnerability database, wherein a host and at least one software product of said host are respectively associated with more than one of a plurality of vulnerability scores;
a fix database query module for querying a fix database;
a composite risk determination module for determining a composite risk score based on data from said vulnerability database and based on data from said fix database, wherein said composite risk score measures at least in part a severity reflecting that an exploited vulnerability is needed by an attacker to compromise at least one of said host and said at least one software product of said host, and wherein said composite risk score is based on a highest vulnerability score among the more than one of said plurality of vulnerability scores respectively associated with at least one of said host and said at least one software product of said host;
an aggregate risk determination module for determining an aggregate risk score based on data from said vulnerability database and based on data from said fix database, wherein said aggregate risk score measures at least in part a number of options available to said attacker for compromising at least one of said host and said at least one software product of said host, and wherein said aggregate risk score is based on a summation among the more than one of said plurality of vulnerability scores respectively associated with at least one of said host and said at least one software product of said host; and
a risk determination module for determining and reporting a risk score based on at least one of said composite risk score and said aggregate risk score, and based on a graph representing said at least one software product of said host, wherein nodes of said graph represent software states of said at least one software product, wherein edges of said graph represent vulnerabilities detected in said at least one software product, wherein a path through said graph begins from a start node having relatively lower access vulnerability based on data from said vulnerability database, and wherein said path ends at an end node having relatively higher vulnerability impact.

18. The system of claim 17 further comprising:
a software product risk contribution module for determining a software product contributing the most risk to an enterprise.

19. The system of claim 17 further comprising:
a host risk contribution module for determining a host contributing the most risk to an enterprise.

20. The system of claim 17 further comprising:
a vulnerability risk contribution module for determining a vulnerability contributing the most risk to an enterprise.

* * * * *